United States Patent
Weitkamp

(10) Patent No.: US 6,850,821 B2
(45) Date of Patent: Feb. 1, 2005

(54) CONTROL SYSTEM FOR A WIND POWER PLANT

(75) Inventor: Roland Weitkamp, Belm (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/354,054

(22) Filed: Jan. 28, 2003

(65) Prior Publication Data

US 2003/0127862 A1 Jul. 10, 2003

Related U.S. Application Data

(62) Division of application No. 09/802,044, filed on Mar. 7, 2001, now abandoned.

(51) Int. Cl.[7] .............................................. G06F 19/00
(52) U.S. Cl. ........................ 700/286; 700/21; 114/102; 416/19; 290/55
(58) Field of Search ................................. 700/174, 108, 700/21, 286, 291, 245, 297; 416/19, 139; 114/102; 322/32, 22, 25; 290/55, 44

(56) References Cited

U.S. PATENT DOCUMENTS

| 4,582,013 A | * | 4/1986 | Holland, Jr. ............... 114/39.3 |
| 6,239,504 B1 | * | 5/2001 | Gobrecht et al. ............. 290/52 |
| 6,512,966 B2 | * | 1/2003 | Lof et al. .................... 700/291 |

\* cited by examiner

Primary Examiner—Kidest Bahta
(74) Attorney, Agent, or Firm—Blakely, Sokoloff, Taylor & Zafman LLP

(57) ABSTRACT

A control system for a wind power plant that includes a damage module and a control module. The damage module compares existing stress conditions on one or more component parts of the wind power plant to current energy generating costs. The control module alters electric power generated by the wind power plant based upon the comparison.

23 Claims, 1 Drawing Sheet

CONTROL SYSTEM FOR A WIND POWER PLANT

RELATED APPLICATION

This application is a divisional of U.S. patent application Ser. No. 09/802,044, filed Mar. 7, 2001, now abandoned.

The present invention relates to a control system for improving the efficiency of wind power plants.

BACKGROUND OF THE INVENTION

The annual energy output to be obtained by a wind turbine decisively depends, apart from the performance of the generator as installed, on the rotor diameter. Thus, for increasing the efficiency, it is desirable to use rotors of the largest possible size. However, when enlarging the rotor diameter while otherwise operating the plant under the same conditions, difficulties arise because the stresses acting on the rotor, the nacelle, the tower and the foundation will increase at least by the second power of diameter. Presently usual ratios between the performance of the generator as installed and the rotor area (rating) are in a range from 460 to 330 $W/m^2$, the latter value pertaining to pitch-regulated turbines optimized for inland use.

According to an approach frequently used in wind energy technology, an existing turbine to be used in sites with weak winds can be retrofitted to have a larger rotor diameter, with the switch-off speed being lowered from e.g. 25 m/s to 20 m/s to safeguard that the stresses will remain in the allowable range.

Further, in plants with blade adjustment (pitch-type plants), it is a usual practice to adjust the rotor blades towards the direction of the feathered pitch already before the rated power is reached, thus reducing the stresses (particularly those acting on the tower).

According to a more complex and longer-known approach for reducing the above mentioned stresses, the rotational speed of the rotors and/or the power output of the turbine can be decreased in case of high wind velocities. For technical reasons (design of the transmission and/or generator and/or converter), decreasing the rotational speed of the rotors will have the effect that the power output is reduced at least according to the same ratio. Since, however—as widely known (cf. for instance "The Statistical Variation of Wind Turbine Fatigue Loads", Riso National Laboratory, Roskilde DK, 1998)—the largest part of the high stresses that tend to shorten the lifespan will occur at high wind velocities, the above approach is successfully used particularly at inland locations for improving the efficiency of wind energy plants. Particularly at inland locations, use can thus be made of larger rotors which during the frequent low wind velocities will yield higher energy outputs but upon relatively rare high wind velocities will have to be adjusted correspondingly.

Further, the state of the art (DE 31 50 824 A1) includes an opposite approach for use in a wind turbine with fixed rotational speed, wherein, during high wind velocities with merely low turbulences, the power output of the turbine can supposedly be increased beyond the rated power by adjusting the rotor blade angle through evaluation of signals from a wind detector.

SUMMARY OF THE INVENTION

The above outlined known approach of reducing the power output in case of high wind velocities makes it possible—e.g. in a variable-speed pitch plant with a control algorithm for controlling the rotor speed on the basis of the pitch angle averaged over time to obtain very high ratios between the rotor diameter and the generator performance without an accompanying increase of component fatigue as compared to conventionally designed turbines. A rating of 330 to 280 W/m2 can be obtained and is economically reasonable especially at inland locations.

For reasons of safety, the design of the towers of wind power plants is on principle determined on the basis of very unfavorable assumptions (e.g. high wind turbulences and maximum wind distribution in the designed wind zone); therefore, in the majority of locations, considerable safety margins of the power output are left unused in the turbines. Thus, the problem exists how these normally existing safety margins can be utilized for improving the efficiency of the turbine.

According to an embodiment of the invention, this problem is solved by performing, by means of an already existing or additionally installed sensor arrangement with connected signal processing system in the wind power plant, a direct or indirect quantification of the current turbine stresses. By comparison with allowable stresses (or correlating values) detected by computation or empirically, the turbine will be operated with a rotor speed and a power yield which are optimized under the economical aspect.

Other than in the normally used state of the art wherein the operational control process is provided to control the blade angle and/or the rotational speed according to fixed functions in dependence on power, blade angle or wind velocity, this navel control process is to be performed only to the extent required due to the local conditions or meteorological conditions at the respective point of time to thus obtain optimum efficiency.

A simple algorithm suited for the above purpose is based on the statistical evaluation of one, a plurality or all of the measurement values (e.g. rotor speed, generator performance, pitch angle, pitch rate, wind velocity and wind direction) mentioned among those operating data which are anyway continuously detected in many present day wind power plants (e.g. variable-speed pitch plants). in the present context, the term "statistical evaluation" is meant to include at least the continuous detection of the minimum, maximum and average values and the standard deviation for a plurality of sliding time intervals 6.t (30 s to 60 mm.). More-complex statistical evaluations of the operating data or the derivations thereof will result in a more successful control. Since wind is a stochastically distributed value, a reasonable detection and arithmetical representation of the measurement values can be performed only by means of distribution and probability functions or spectra. On the basis of measurements or simulation computations, the correlation coefficients of the statistical data relative to the local and meteorological conditions and the current stresses on the components can be determined with sufficient accuracy. For instance, the average pitch angle and the average rotor speed for a given turbine configuration are in direct relation to the average wind velocity; the standard deviation of the two former values allows for a conclusion on the turbulence intensity (gustiness) of the wind. Thus, besides the directly measured operating data, also important stress data (e.g. the blade bending moment and the thrust acting on the tower) can be statistically evaluated. These actual distributions of the stresses or of the values directly related thereto are compared to desired distribution functions which have been obtained by computation or empirically. These desired .functions can be detected for each location as suited for the specific application and be stored in a data memory of the control system.

An example of an embodiment of the control system using the inventive control strategy will be explained in greater detail hereunder in connection with the accompanying drawing.

BRIEF DESCRIPTION OF THE DRAWING

The sole drawing is a block diagram of the control system using the control strategy according to an embodiment of the instant invention.

DESCRIPTION OF A PREFERRED EMBODIMENT

Figure 1:
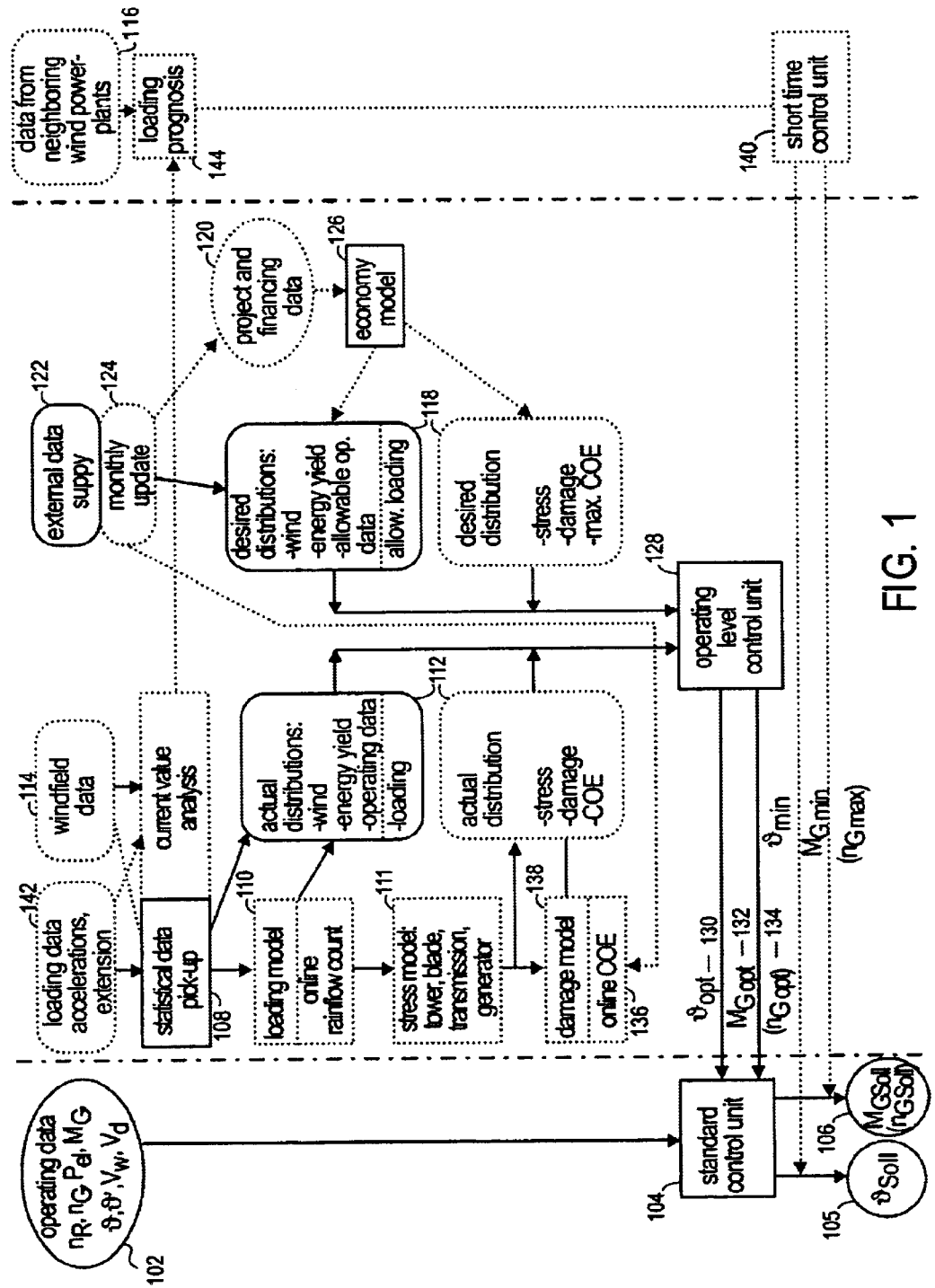

In the block diagram, angular boxes are meant to represent signal processing systems or computing modules of a larger software package installed in a signal processing system. Laterally rounded boxes represent input data for the control system, irrespective of whether these data are measured on the turbine or supplied from an external source. Boxes curved on top and bottom represent data stores containing all data which are required for the execution of the control algorithm and are made available through the internal data detection or analysis, or are supplied from external data sources. Elements represented in solid lines are absolutely required for the control system; elements represented in dotted lines are optional components which improve the function of the control system and thus allow for a higher energy yield even though they will cause an increasing complexity of the control concept. Schematically shown to the left of the vertical dash-dotted line in the left-half of the drawing is a schematic representation of the control systems used according to the state of the art. The input values 102 are the operating values provided to be permanently detected by the measurement sensors, such as the rotor and generator speeds $n_R$ and $n_G$, respectively, the electrical power $P_{el}$, the generator torque $M_G$, the blade or pitch angle $\theta$ and the pitch rate $\dot{\theta}$, and the wind velocity $v_w$ and the wind direction $v_{dir}$. On the basis of these measurement values, the turbine is controlled according to an algorithm implemented in the main computer 104 for operating the plant (standard control) 104. The regulated quantities are the pitch angle $\theta$ 105 an/or the generator moment $M_{GSoll}$ 106 (e.g. also by selection of the generator stage in asynchronous turbines with switchable polarity). The control loop wherein, by means of the actuators, the desired values are turned into actual values which then will be detected as operational values to be used as control input values as schematically indicated, has been omitted from the block diagram for better survey.

According to the state of the art, additional measurement values (e.g. temperatures, hydraulic pressures, tower head accelerations, oil level and wear indications) allow for the detection of certain conditions of the plant and, if required, will result in shut-down of the turbine.

In the control system, the operating data are subjected to a statistical data pick-up 108 and are stored as spectra or distributions in a data store. Optionally, in the so-called loading model 110, the statistical operating data are converted 112 into statistical stress data by means of the correlation functions obtained in the simulation computations.

More-complex algorithms are based on additional measurement values which are more closely related to the stresses, and such algorithms allow for a distinctly more precise detection of the existing distribution of stresses and thus for a closer approach to the limiting values dictated by the respective design, thus obviating the need for the safety margins necessitated in simple algorithms.

The sensors on the turbine can be provided, Inter alia, as acceleration sensors on the tower head and the rotor blades, and/or wire strain gauges on representative points of the support structure (e.g. on the blade roots, rotor shaft, base of the tower).

By inclusion of additional wind-field data 114 which in the ideal case characterize the undisturbed onflow before the rotor, the control behavior can be considerably improved. Generally, for this purpose, use can be made of laser-optical and/or acoustic (ultrasonic) measuring methods which are suited both for measurements on individual points in the wind field and for measurements of complete wind profiles or wind fields in the rotor plane or also far before the rotor plane. A further improvement of the control behavior is accomplished by linking the control systems of the different turbines 116 of a wind park to each other; the considerably enlarged data base obtained in this manner will safeguard a faster but still statistically reliable response of the control systems.

All of the detected spectra or distributions will be stored, preferably classified according to operating year, average wind velocity and turbulence intensity.

Upon sufficiently accurate determination of the stresses through detection of stress data, it appears reasonable to transform the stress changes into so called Markov matrices by use of known counting methods or on the basis of the average values (online rainflow counting). To this end, microchips which have already entered the stage of industrial production are available from the field of aviation and space technology.

The actual distributions 112 which have been measured or have been computed from the measurement data are compared to the desired distributions 118 of the same values. For this purpose, data on design, planning and financing 120 are externally collected 122, input into the system and stored in a data store 124. Using an economy model 126, the desired distributions are derived from these data 120. Design data include e.g. the allowable loading distributions for the individual components; an example of the planning data is the expected wind distribution at the location; and the financing data include, in addition to the overall project costs, the current credit costs, the energy profits required according to the financing plan, and the current charges for. power supply. Monthly updates 124 of these data per remote monitoring can be used for immediate adaptation of the control system to changes of the basic conditions, e.g. to changes of the charges for power supply or of the financing costs, new recognitions on the allowable stresses on the components, or even improved control algorithms. Data on the supra regional annual wind distribution make it possible, on the one hand, by comparison with the measured wind distribution at the location, to perform a correction of the planning data; on the other hand, in less favorable wind years, the turbine can be operated by use of a "sharper" power characteristic curve for keeping up with the requirements of the financing plan.

In the operating level control unit 128, the thus obtained desired distributions 118 are compared with the actual distributions 112. This way, the optimum operating level under the current meteorological and local conditions is computed. The regulated quantities $\theta_{opt}$ (blade angle) 130 and $M_{Gopt}$ 132 and $n_{Gopt}$ 134 (generator moment and generator speed, respectively) are to be understood as preset average values while, on the other hand, the current desired values supplied by the standard control system for adjustment to wind turbulences may temporarily deviate from these average values.

With the availability of such a control system, it may be advisable to operate the turbine with higher power yield in the first years of operation in order to lower the financing costs as quickly as possible, whereas, in later years, a low stress operation with reduced energy yield and a resultant lengthened lifespan may be considered optimum under the economic aspect.

In the ideal case, the above described control system is improved by the feature of an on-line detection of the current energy generating costs (Cost Of Energy COE) 136. For this purpose, it is required that the loading model 110 is combined, downstream thereof, with a stress model 111 for the individual components of the plant (a restriction to the main components, i.e. the rotor blades, the transmission, the generator, the converter and the tower will be sufficiently accurate), and with a damage model 138. The stress model 111 transforms the loading distributions into stress distributions on representative points of the components and is based on the methods applied in the design of the components. The results from finite element calculations can be summarized e.g. by consideration of merely a small number of compliance factors for some critical points. The damage model 138 compares the existing loading influences (e.g. Woehler lines) and thus computes the current component damage. (The damage of a component permits conclusions on the remaining lifespan). Therefore, the damage model 138 has to rely on a data base of the material or component behavior which is made available from an external source 122 and should be of a modular type so as to be adaptable to the most up-to-date recognitions (e.g. Woehler tests on original components, practical experiences from the serial production) in the course of the lifespan of the turbine. Since, in the present state of the art, particularly the material behavior has to be estimated on a very conservative basis due to lack of a sufficient data basis, the above adaptation feature offers a wide potential for yield increase.

If the damage model 138 has been suitably refined to allow for an online calculation of the damage and thus also of the damage rate for the important main components, the results of such calculation can be easily used for determining an equivalent damage rate for the whole turbine (Equivalent Damage Rate, EDR). The equivalent damage rate (unit: US$/h) is a measure for the costs per time unit incurred by damage in the current operating condition of the turbine. The current energy generating costs can then be obtained by dividing the sum of the EDR and the other operating costs by the current power fed into the grid.

On this ideally refined level of the control strategy wherein the economical efficiency of the wind turbine is reduced to the decisive characteristic factor "cost of energy COE", the efficiency model has to be adapted to determine, as a value for comparison to the current COE, the maximum allowable COE where the turbine is still allowed to be operated. Should the current COE values 112 be too high in situations with weak winds, the turbine will be taken off the grid. Should the current COE values 112 be too high in situations with high wind velocities, the operating level control unit will lower the excessive stresses by suitably controlling the turbine, thus decreasing the COE value. Thus, by the above online COE determination 136, the optimum operating level with the lowest possible COE values can be obtained for the current local and meteorological conditions by use of a simple control loop. On this optimum operating level, if the COE values are higher than the maximum allowable COE 118 value determined by the economy model 126, the turbine will be brought to a standstill until more favorable conditions occur (e.g. lower turbulences or lower wind velocity). Thus, during low turbulences, the turbines can supply power still in case of much higher wind velocities than had been possible in the state of the art.

As a further possible component, schematically illustrated in the right-hand edge region of the drawing to the right of the vertical dash-dotted line, a short-time control unit 140 may be provided for reduction of temporary loading peaks. The input data of said unit 140 include loading data 142 and optionally also wind field 114 data, which other than in the operating level control unit 125—are not evaluated statistically but subjected to a current value analysis; in a signal processing model 144 also referred to as a loading prognosis, predictions can thus be made on loading peaks which will be reduced by the short-time control unit 140 through limitation the pitch angle 105 or the rotor speed 106.

Therefore, particularly when using of data of neighboring wind power plants 116 located upstream relative to the wind direction, the loading of the plant and thus also the current COE value 112 during wind velocities above the nominal wind are massively reduced; notably, turbines located behind other turbines in the wind direction can react exactly and with a suitable delay on wind occurrences which have been registered in the turbine arranged upstream. Thus, the unavoidable disadvantages (trailing turbulences) for the following turbines can be compensated for.

For guaranteeing that the available potential of the plant will not be reduced in case of a possible failure of one component of the above control system, the operating control system should preferably be designed such that the standard control system illustrated on the left: side of the drawing is separated, under the hardware aspect, from the other components of the operating level control unit 128. Thus, should the operating level control unit 128 be not available, the turbine will nonetheless remain connected to the grid, even though it will then be subjected to the power limitation for high wind velocities as provided by the state of the art.

The described control strategy is by no means limited to the illustrated embodiment for a variable-speed pitch plant but is in its essence also useful for pitch plants designed for fixed speeds or pole reversal, or for stall or active stall plants.

Further, a large number of specific details and refinements of the system can be contemplated (additional measurement values, damage modules for further components of the plant etc.), all of them following the basic idea of determining the optimum operating time under the current local and meteorological conditions.

What is claimed is:

1. A control system for a wind power plant, comprising:
   a damage module operable to compare existing stress conditions on one or more component parts of the wind power plant to current energy generating costs; and
   a control module operable to alter electric power generated by the wind power plant based upon the comparison.

2. The control system of claim 1, further comprising:
   a cost of energy module operable to provide the current energy generating costs based upon financing data for the wind power plant and current charges for power delivery.

3. The control system of claim 1, further comprising:
   a stress module operable to determine existing stress conditions on one or more component parts of the wind power plant and to provide data on existing stress conditions on the one or more component parts of the wind power plant to the damage module.

4. The control system of claim 3, wherein the stress module compares existing stress on a first component to designed allowable stresses to provide the stress data to the damage module.

5. The control system of claim 3, wherein the stress module determines existing stress conditions on a first component based upon local meteorological conditions.

6. The control system of claim 1, wherein the control module changes blade pitch of one or more turbine blades of the wind power plant to alter the electrical power generated by the wind power plant.

7. The control system of claim 6, wherein change to the blade pitch occurs in a direction of a feathered pitch.

8. The control system of claim 1, wherein the control module alters rotor speed of the wind power plant to alter the electrical power generated by the wind power plant.

9. The control system of claim 1, further comprising:
a second control module to anticipatorily reduce loading of the wind power plant based upon receiving data of neighboring wind power plants located upstream relative to a wind direction.

10. The control system of claim 1, wherein the damage module determines the damage to the one or more components based upon actual spectra.

11. A method, comprising:
comparing existing stress conditions on one or more component parts of a wind power plant based upon local meteorological conditions to energy generating costs at that time; and
controlling blade pitch of one or more turbine blades of the wind power plant based upon the comparison.

12. The method of claim 11, further comprising:
detecting a direction of a wind; and
anticipatorily reducing loading of the wind power plant based upon receiving data from one or more neighboring wind power plants located upstream relative to the direction of the wind.

13. The method of claim 11, further comprising:
determining the energy generating costs at that time based upon financing data for the wind power plant and current charges for power delivery.

14. The method of claim 11, further comprising:
determining the existing stress on a first component by measuring strain on representative points along the first component, factoring in how long the first component has been in service, and factoring in a magnitude of strain that the first component has been exposed to.

15. The method of claim 11, further comprising:
determining the existing stress on a first component by measuring deformation in elastic bearings.

16. An apparatus, comprising:
means for comparing existing stress conditions on one or more component parts of a wind power plant based upon local meteorological conditions to energy generating costs at that time; and
means for controlling blade pitch of one or more turbine blades of the wind power plant based upon the comparison.

17. The apparatus of claim 16, further comprising:
means for controlling rotor speed of the wind power plant to alter electrical power generated by the wind power plant.

18. The apparatus of claim 16, further comprising:
means for detecting a direction of a wind; and
means for anticipatorily reducing loading of the wind power plant based upon receiving data from one or more neighboring wind power plants located upstream relative to the direction of the wind.

19. The method of claim 16, further comprising:
means for determining the energy generating costs at that time based upon financing data for the wind power plant and current charges for power delivery.

20. The method of claim 16, further comprising:
means for determining the existing stress on a first component by measuring strain on representative points along the first component, factoring in how long the first component has been in service, and factoring in a magnitude of strain that the first component has been exposed to.

21. A control system for a wind power plant, comprising:
a stress module operable to statistically determine existing stress conditions on one or more component parts of the wind power plant and then compare the statistically determined existing stress conditions to predicted stress distributions; and
a control module operable to alter electric power generated by the wind power plant based upon the comparison.

22. The control system of claim 21, wherein the control module alters rotor speed of the wind power plant but maintains the same level of electrical power generated by the wind power plant.

23. The control system of claim 21, wherein the control module alters rotor speed of the wind power plant based upon the comparison independent of the electrical power generated by the wind power plant.

* * * * *